(12) United States Patent
Vogel et al.

(10) Patent No.: US 10,295,394 B2
(45) Date of Patent: May 21, 2019

(54) METHOD AND MEASURING DEVICE FOR FILL LEVEL MEASUREMENT

(71) Applicant: Endress + Hauser GmbH + Co. KG, Maulburg (DE)

(72) Inventors: Markus Vogel, Hausen i. W. (DE); Alexey Malinovskiy, Maulburg (DE); Stefan Gorenflo, Hausen (DE); Dietmar Spanke, Steinen (DE)

(73) Assignee: ENDRESS+HAUSER SE+CO.KG, Maulburg (DE)

( * ) Notice: Subject to any disclaimer, the term of this patent is extended or adjusted under 35 U.S.C. 154(b) by 631 days.

(21) Appl. No.: 14/366,310

(22) PCT Filed: Nov. 22, 2012

(86) PCT No.: PCT/EP2012/073343
§ 371 (c)(1),
(2) Date: Jun. 18, 2014

(87) PCT Pub. No.: WO2013/092099
PCT Pub. Date: Jun. 27, 2013

(65) Prior Publication Data
US 2014/0360264 A1    Dec. 11, 2014

(30) Foreign Application Priority Data
Dec. 20, 2011   (DE) .................. 10 2011 089 231

(51) Int. Cl.
*G01F 23/296*   (2006.01)
*G01F 23/284*   (2006.01)

(52) U.S. Cl.
CPC ........ *G01F 23/2962* (2013.01); *G01F 23/284* (2013.01)

(58) Field of Classification Search
CPC .................. G01F 23/2962; G01F 23/284
(Continued)

(56) References Cited

U.S. PATENT DOCUMENTS

| 4,453,550 A | 6/1984 | Flax |
| 5,457,990 A | 10/1995 | Oswald |

(Continued)

FOREIGN PATENT DOCUMENTS

| DE | 10249544 B4 | 5/2004 |
| EP | 1324067 B1 | 7/2003 |

(Continued)

OTHER PUBLICATIONS

English Translation of the International Preliminary Report on Patentability, WIPO, Geneva, dated Jul. 3, 2014.

(Continued)

*Primary Examiner* — Eman A Alkafawi
(74) *Attorney, Agent, or Firm* — Bacon & Thomas, PLLC

(57) ABSTRACT

A method for measuring fill level and a measuring device for performing the method, wherein, in measuring cycles following one after the other, signal pulses of predetermined frequency sent by means of a transmitting and receiving system with a predetermined repetition frequency into a container, and their signal components reflected back in the container in the direction of the transmitting and receiving system after a travel time dependent on their traveled path, are received as received signal. A fill level is measured taking into consideration a phase relationship between the transmitted and received signals related physically with the fill level to be measured. In each measuring cycle, based on the received signal, an auxiliary signal is derived reflecting amplitude and phase information in the received signal as a function of travel time, based on the auxiliary signal, a travel time of a signal fraction reflected on a surface of the substance is determined as fundamental travel time are determined, based on the travel times of the zero crossings of the auxiliary signals determined in the current and in a plurality of preceding measuring cycles, a phase appear- (Continued)

ance-frequency distribution is derived as a function of travel time, which gives appearance-frequencies, with which zero crossings were present on the respective travel times in the associated auxiliary signals, a travel time of a maximum of the frequency distribution lying nearest the fundamental travel time is determined as fill level travel time, and the fill level is determined based on the fill level travel time.

14 Claims, 5 Drawing Sheets

(58) Field of Classification Search
USPC ................................. 702/166, 48, 46, 50, 51
See application file for complete search history.

(56) References Cited

U.S. PATENT DOCUMENTS

| 6,087,978 | A  | 7/2000  | Lalla  |
| 6,806,824 | B2 | 10/2004 | Kornle |

| 2002/0109626 | A1* | 8/2002  | Spanke ................. G01F 23/284 |
| | | | 342/124 |
| 2003/0146867 | A1  | 8/2003  | Kornle |
| 2011/0098970 | A1  | 4/2011  | Hug |
| 2012/0085165 | A1* | 4/2012  | Hortenbach ........ G01F 23/2967 |
| | | | 73/290 V |
| 2012/0265486 | A1* | 10/2012 | Klofer ................. G01F 23/0061 |
| | | | 702/166 |

FOREIGN PATENT DOCUMENTS

| EP | 2088453 A1    | 8/2009 |
| WO | 2009031884 A1 | 3/2009 |

OTHER PUBLICATIONS

German Search Report, German PTO, Munich, dated Sep. 11, 2012.
International Search Report, EPO, The Netherlands, dated Mar. 14, 2013.

* cited by examiner

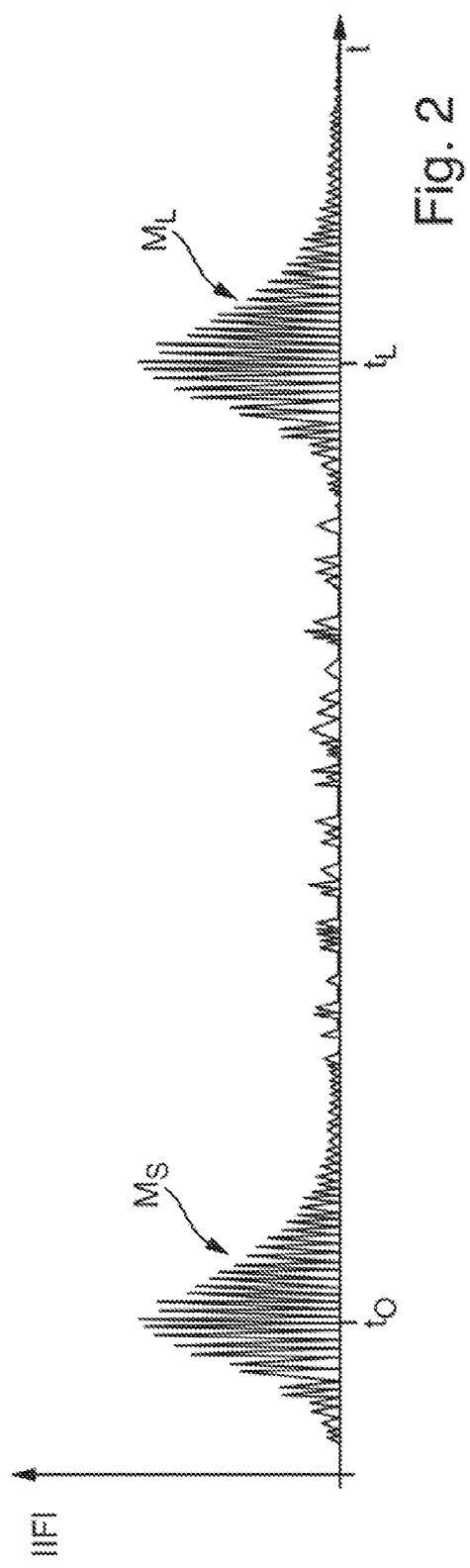
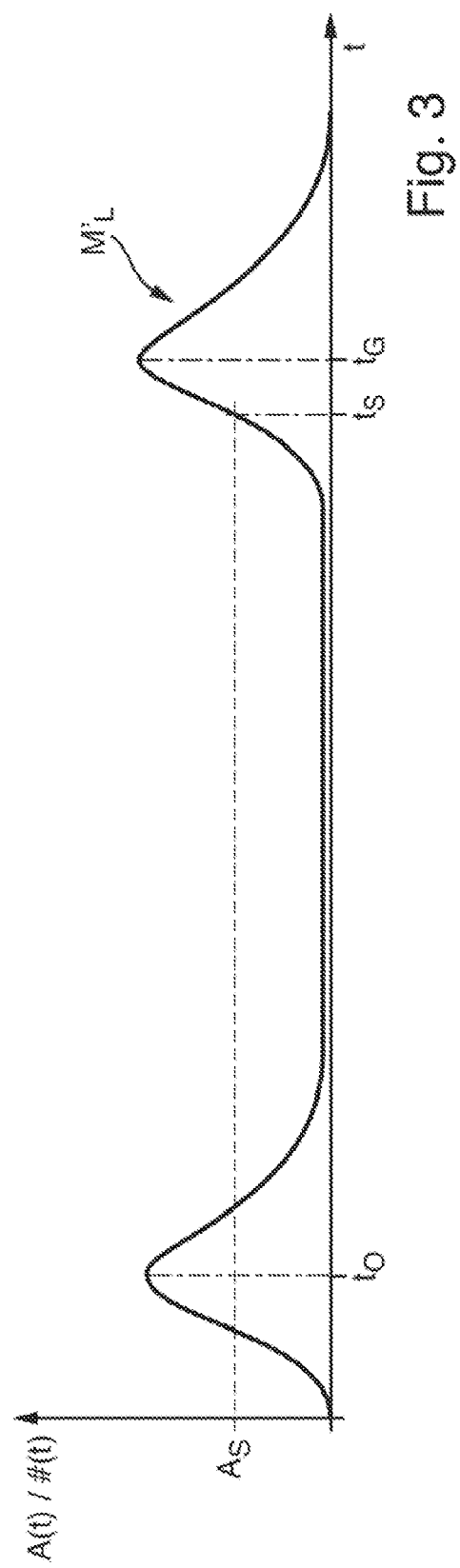

METHOD AND MEASURING DEVICE FOR FILL LEVEL MEASUREMENT

TECHNICAL FIELD

The invention relates to a method and to a measuring device for measuring fill level of a substance located in a container, in the case of which signal pulses of predetermined frequency are sent in measuring cycles following one after the other by means of a transmitting and receiving system with a predetermined repetition frequency into the container, and their signal components reflected back in the container in the direction of the transmitting and receiving system, after a travel time dependent on their traveled path, are received as received signal, based on the received signal, over a predetermined travel time range, in each case, an auxiliary signal is derived reflecting amplitude and phase information in the received signal as a function of travel time, based on the auxiliary signal, a travel time of a signal fraction reflected on a surface of the substance is determined, and fill level is determined based on a propagation velocity of the signal pulse, an installed height of the transmitting and receiving system above the container and the travel time of the signal fraction reflected on the surface of the substance.

BACKGROUND DISCUSSION

Such fill level measuring devices working according to the travel time principle are widely applied in industrial measurements technology.

A measuring device group of this type applied in industrial measurements technology is formed by fill level measuring devices working with microwaves according to the pulse radar method. Such devices are sold, for example, by the assignee under the mark Micropilot.

In the pulse radar method, short microwave pulses with frequencies in the gigs hertz range are periodically sent toward the substance with a predetermined repetition frequency, e.g. a repetition frequency having an order of magnitude of 1 to 2 MHz, and their signal components reflected back in the container in the direction of the transmitting and receiving system are received after a travel time dependent on the traveled path. In such case, regularly based on the received signal, an auxiliary signal is derived, which shows amplitude and phase information in the received signal as a function of associated travel time.

Due to the high signal frequencies and the, as a rule, very short travel times, respectively travel time differences, to be resolved, for this, an auxiliary signal, designated frequently as an intermediate frequency signal, is generated, which is a version of the received signal expanded in time. A corresponding method is described, for example, in European Patent EP 1 324 067 A2. As likewise described there, the auxiliary signal is usually subsequently rectified and fed via a low-pass filter and an analog-digital converter to an evaluation unit. Since the amplitude of the received signals decreases with the square of the traveled path, the received signal can have strongly different amplitudes. In order better to handle this situation, the auxiliary signal is preferably supplementally transformed into a logarithmic representation. The measuring of the travel time of the signal fraction reflected on the surface of the substance occurs by determining an envelope of the rectified, log, filtered and digitized, auxiliary signal. This envelope is frequently referred to as the amplitude envelope curve. The envelope curve is a plot of amplitude of the time expanded, received signal as a function of the travel time. For any given reflector, the envelope curve will show a maximum at the travel time required for the signal to travel the path from the transmitting and receiving system to the reflector and back. Correspondingly, the sought separation results directly from the travel time of the maximum of the envelope curve and the propagation velocity of the used signals.

It is known to improve the accuracy of measurement of such fill level measuring devices by conducting, besides the described evaluation of the amplitudes of the received signal, respectively the intermediate signal derived therefrom, supplementally a determination of a phase difference between the transmitted and received signals, and to use such for correcting the amplitude determined travel time of the signal fraction reflected on the surface of the substance.

Such methods and measuring devices are described, for example, in German Patent, DE 44 07 369 A1 and Published International Application, WO 02/065066 A1. Determining the phase difference between the transmitted and received signals requires, as a rule, relatively complex circuits and evaluation methods.

A clearly more cost, and energy, efficient method as regards circuitry and evaluation is known from European Patent, EP 1 324 067 A2. Described there is a method for measuring fill level of a substance located in a container, wherein, in measuring cycles following one after the other, signal pulses of predetermined frequency are sent by means of a transmitting and receiving system with a predetermined repetition frequency into the container, and their signal components reflected back in the container in the direction of the transmitting and receiving system are received as received signal after a travel time dependent on their traveled path, based on the received signal, an auxiliary signal is derived reflecting amplitude and phase information of the received signal as a function of travel time, based on the auxiliary signal, a travel time of a signal fraction reflected on the surface of the substance is determined as fundamental travel time, travel times of zero crossings of the auxiliary signal are determined, based on the travel times of the zero crossings, a phase difference between the transmitted signal and the received signal is determined, based on the phase difference, a correction of the measured fundamental travel time is performed, and fill level is determined based on a propagation velocity of the signal pulse, an installed height of the transmitting and receiving system above the container and the corrected fundamental travel time.

In such case, the fundamental travel time is determined also here as travel time of a maximum of an envelope curve of the rectified, log, filtered and digitized auxiliary signal attributable to the reflection on the surface of the substance. In parallel therewith, the phase difference between the transmitted signal and the received signal is derived based on the log auxiliary signal. For this, the logarithmic auxiliary signal is differentiated via a differentiating stage twice with respect to travel time. Provided on the output of the differentiating stage is therewith an output signal, which has marked peaks at the travel times corresponding to the zero crossings of the auxiliary signal. Therewith, the travel times of the zero crossings and thus the phase shift of the received signal can be determined, without having to digitize the output signal. The peak-amplitudes can be normalized, for example, with the assistance of a Schmitt-trigger and the associated travel times registered with the assistance of a timer. This provides a circuit-wise very simply and cost effectively implementable method consuming little energy for determining the phase difference between transmitted and received signals.

In the case of registering the phase difference between transmitted and received signals for measurements, there results the problem that the phase shift of the received signal, respectively of the auxiliary signal, relative to the associated transmitted signal can also be slightly different from measuring cycle to measuring cycle even in the case of unchanged fill level. Cause for this scattering of the measured phase differences are time shifts caused in the circuit and/or in the signal processing both in the direct time relationship between transmitted signal and received signal as well as also between the received signal and therefrom derived additional signals, based on which the phase difference is lastly determined. In such case, the absolute value of a systematically arising constant time shift is, as a rule, uncritical, since it can be determined by reference measurements and correspondingly compensated. In contrast, random fluctuations of the time shift cannot be registered and accordingly also cannot be compensated. Such lead, thus, to a limitation of the achievable accuracy of measurement with which the phase difference and therewith naturally also the fill level can be determined.

Another measuring device group of this type applied in industrial measurements technology is formed by ultrasonic fill level measuring devices working according to the pulse travel time method. The latter are sold, for example, by Endress+Hauser under the mark, PROSONIC. Also in this case, short ultrasonic pulses of predetermined frequency and duration are sent with a predetermined repetition frequency by means of an ultrasonic transducer and a corresponding transmitting and receiving system and their signal components reflected back to the transmitting and receiving system received after a travel time dependent on the traveled path. The frequencies of the ultrasonic pulses lie here, as a rule, in the region of 1 kHz until 200 kHz, so that a time expansion of the received signal received via the ultrasonic transducer is not required. Typically here, an auxiliary signal is derived, which corresponds to the amplified received signal. Apart from this difference concerning the lower signal frequency, the other signal processing occurs, in principle, the same as for fill-level measuring devices working with microwaves. I. e., also here, the auxiliary signal is digitized by means of an analog-digital converter, in given cases, transformed into a logarithmic representation, and an envelope curve derived, which shows the amplitudes of the received signal as a function of the associated travel time required for the path from the transmitting and receiving unit to the respective reflector and back. Based on the envelope curve, also here, the maximum of the envelope curve to be attributed to the reflection on the surface of the substance is determined, and, based on its travel time, the fill level is calculated.

SUMMARY OF THE INVENTION

It is an object of the invention to provide a method and a measuring device for fill level measurement according to the travel time principle, in the case of which the measuring of the travel time of the signal fraction attributable to the reflection on the surface of the substance occurs taking into consideration an as exactly as possible determined, fill level related, phase shift between the transmitted and received signals.

For this, the invention resides in a method for measuring fill level of a substance located in a container, wherein, in measuring cycles following one after the other,
- signal pulses of predetermined frequency are sent by means of a transmitting and receiving system with a predetermined repetition frequency into the container, and their signal components reflected back in the container in the direction of the transmitting and receiving system are received as received signal after a travel time dependent on their traveled path,
- based on the received signal, over a predetermined travel time range, an auxiliary signal is derived reflecting amplitude and phase information in the received signal as a function of the travel time,
- based on the auxiliary signal, a travel time of a signal fraction reflected on a surface of the substance is determined as fundamental travel time,
- travel times of zero crossings of the auxiliary signal are determined,
- based on the travel times of the zero crossings of the auxiliary signals determined in the current and in a plurality of preceding measuring cycles, a phase appearance-frequency distribution is derived as a function of the travel time, which gives appearance-frequencies, with which zero crossings were present at the respective travel times in the associated auxiliary signals,
- a travel time of a maximum of the frequency distribution lying nearest the fundamental travel time is determined as fill level travel time, and
- fill level is determined based on a propagation velocity of the signal pulse, an installed height of the transmitting and receiving system above the container and the fill level travel time.

In a further development of the method
- a cross correlation of the phase appearance-frequency distribution with a reference distribution is formed, and
- the fill level travel time is determined based on a travel time of a maximum lying nearest the fundamental travel time in a distribution resulting from the cross correlation.

In an additional further development of the method
- the frequency values of the phase appearance-frequency distribution are filtered by means of an average value filter, and
- the fill level travel time is based determined on a travel time of a maximum lying nearest the fundamental travel time in the average value filtered, phase appearance-frequency distribution.

In an additional further development
- an average value filtering is performed for the travel times of the zero crossings of the auxiliary signals of measuring cycles following one after the other, and
- the phase appearance-frequency distribution is derived based on the filtered travel times obtained from this average value filtering for the individual measuring cycles.

In a preferred further development of the method
- the travel time range is divided into discrete segments of equal segment length,
- in each auxiliary signal, those segments are determined, in which such auxiliary signal has zero crossings, and
- the phase appearance-frequency distribution is registered as a histogram, whose histogram classes each correspond to a segment.

In a first variant of the method, the phase appearance-frequency distribution in each measuring cycle is determined based on the travel times of the zero crossings of the auxiliary functions derived in such measuring cycle and in a predetermined number of preceding measuring cycles.

In a second variant of the method, the phase appearance-frequency distribution is registered continuously and updated in each measuring cycle, by multiplying in each measuring cycle the appearance-frequencies of the phase appearance-frequency distribution determined in the preceding measuring cycle with a predetermined decay factor, and adding the travel times of the zero crossings newly entering in the respective measuring cycle to the appearance-frequencies existing at the corresponding travel times, as reduced by the decay factor.

In an embodiment of the method according to the first or the second variant, the number of measuring cycles considered in the phase appearance-frequency distribution is fixedly predetermined based on a predetermined fill level change rate to be expected, or the number is continuously matched to a current fill level change rate measured during the method.

In a further development of the method of the invention, the registering of the phase appearance-frequency distribution occurs exclusively within a travel time window surrounding the fundamental travel time determined in the respective measuring cycle, which window extends to both sides of the fundamental travel time over a plurality of reference period lengths, wherein the reference period length equals half of a reciprocal of a frequency corresponding to the frequency of the signal pulses in the auxiliary signal, and whose window width is smaller than a width of fill level maxima of the auxiliary functions attributable to reflections on the surface of the substance.

In a further development of the latter further development a fundamental travel time measured at the beginning the method is stored as reference travel time, based on this reference travel time, a position of the travel time window along a travel time axis is established, in each measuring cycle, it is checked whether a difference between the fundamental travel time measured in such measuring cycle and the stored reference travel time exceeds a predetermined threshold value, and in each measuring cycle, in which the difference exceeds the threshold value, the stored reference travel time is replaced by an updated reference travel time, which equals the fundamental travel time measured in such measuring cycle, and the position of the travel time window is newly established based on the updated reference travel time.

In a further development of the latter further development, the threshold value is dimensioned as a function of the travel time window width and the width of the fill level maxima of the auxiliary function in such a manner that the travel time window in each measuring cycle covers a travel time range of a plurality of reference period lengths on both sides of the current fundamental travel time.

In a further development of the method of the invention, the fundamental travel time is determined in each measuring cycle based on the travel times of the zero crossings of the auxiliary signal derived in the respective measuring cycle, wherein time periods between sequentially following zero crossings of the auxiliary signal are determined, a time window of predetermined length is shifted stepwise over the total travel time range, for each position of the time window, an appearance-frequency is determined, with which there occur in the time window time periods, whose length corresponds to half of a period in the auxiliary signal corresponding to the frequency of the signal pulses, a period appearance-frequency distribution of the appearance-frequencies is determined as a function of travel times associated with the positions of the time window, a maximum of the period appearance-frequency distribution attributable to the reflection of the signal pulses on the surface of the substance is determined, and the fundamental travel time is determined based on a travel time of the fill level maximum, especially that travel time, in the case of which the fill level maximum assumes its maximum value, or that travel time, in the case of which a rising or falling edge of the fill level maximum exceeds or subceeds a predetermined threshold value.

In a further development of the latter further development, the travel time range for deriving the period envelope curve is divided into discrete segments, the length of the time window equals a length of a predetermined number of segments, the time window in the case of the stepwise shifting is shifted in each step by one segment, and there is associated with the individual positions of the time window, in each case, that travel time, over which in the respective position a window center of the time window is located.

In a preferred embodiment the signal pulses are microwave pulses sent periodically with the repetition frequency, and the auxiliary signal is a time-expanded version of the received signal, or the signal pulses are ultrasonic pulses sent periodically with the repetition frequency.

Additionally, the invention resides in a fill-level measuring device for performing the method of the invention, comprising a transmitting and receiving system for sending the signal pulses and for receiving the received signals, an input circuit for deriving the auxiliary signals, and a measuring and evaluation unit, which determines in each measuring cycle the travel times of the zero crossings of the auxiliary signal derived in the respective measuring cycle, and which, based on the travel times of the zero crossings of the auxiliary signals of the current and a plurality of preceding measuring cycles, determines the phase appearance-frequency distribution in each measuring cycle.

In a further development of a fill-level measuring device of the invention, the measuring and evaluation unit comprises a rectifier for rectifying the auxiliary signal, a differentiating stage connected to the rectifier for determining a second derivative of the rectified auxiliary signal with respect to travel time, a measuring system connected to the differentiating stage for registering peaks and their travel times arising in an output signal of the differentiating stage, and an intelligent electronic unit, especially a microcontroller, connected after the measuring system.

BRIEF DESCRIPTION OF THE DRAWINGS

The invention and its advantages will now be explained in greater detail based on the figures of the drawing, in which two examples of embodiments are presented and wherein equal parts are provided in the figures with equal reference characters. The figures of the drawing show as follows:

FIG. 2 is a rectified auxiliary signal derived with the fill-level measuring device of FIG. 1;

FIG. 3 is an amplitude curve of an auxiliary signal, respectively an equally formed period appearance-frequency distribution derived based on the auxiliary signal, as a function of travel time;

DETAILED DISCUSSION IN CONJUNCTION WITH THE DRAWINGS

The method of the invention for fill level measurement as well as a fill-level measuring device for performing this method will now be described using the example of a pulse radar fill-level measuring device.

Figure 1:
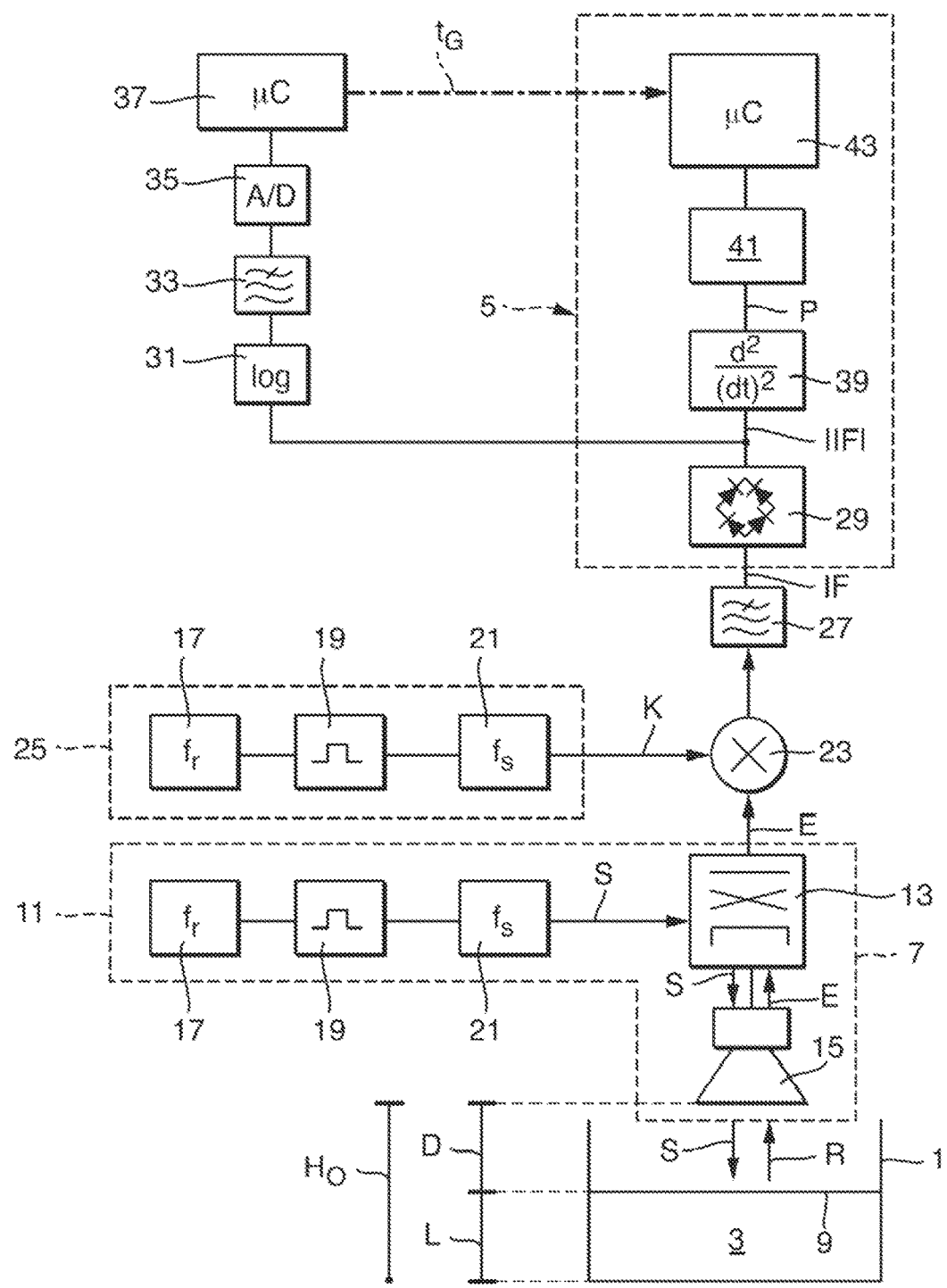
FIG. 1 is a schematic representation of a fill level measuring arrangement with a pulse radar, fill-level measuring device.

FIG. 1 shows, in this connection, a schematic representation of a fill level measuring arrangement for measuring fill level L of a substance 3 located in a container 1 with a pulse radar, fill-level measuring device with a measuring and evaluating unit 5 of the invention.

The fill-level measuring device includes a transmitting and receiving apparatus 7, with which it sends in measurement operation in measuring cycles following one after the other, in each case, a transmitted signal S in the direction of a surface of the substance 9 located at the separation D to be measured from the transmitting and receiving apparatus 7. The transmitted signals S are signal pulses of predetermined frequency $f_s$ and duration generated with a predetermined repetition frequency $f_r$.

The transmitting and receiving apparatus 7 includes a transmitted signal generator 11, which generates microwave pulses of the predetermined frequency $f_s$ with the predetermined repetition frequency $f_r$ and supplies such via a directional coupler 13 to an antenna 15 mounted above the surface of the substance 9. Antenna 15 sends the signal S provided by the signal generator 11 into the container 1.

Signal generator 11 includes, for example, an oscillator 17 oscillating with the repetition frequency $f_r$ and connected with a pulse generator 19. Pulse generator 19 produces based on the oscillator signal a control signal of short, sequentially following, rectangular pulses, with which a microwave source 21 is operated. The microwave source 21 is, for example, a Gunn diode. It can either, such as here presented, be switched on and off via the control signal applied as trigger signal for such purpose, or it can continuously produce microwaves of the predetermined frequency $f_s$, which are then fed to a gate circuit, which opens or closes as a function of the control signal.

Signal components R of the transmitted signal S reflected back in the container 1 in the direction of the transmitting and receiving system 7 are received by such via the antenna 15 as received signal E after a travel time t dependent on the path traveled in the container 1.

Derived in the transmitting and receiving system 7 based on the signal E received in the respective measuring cycle is an auxiliary signal IF, which shows amplitude and phase information of the received signal E as a function of travel time t over a predetermined travel time range. The travel time range begins in each measuring cycle with a starting time $t_0$, when the first microwave pulse of the transmitted signal S is sent. The total duration of the travel time range is bounded upwardly by the repetition period duration $1/f_r$ corresponding to the repetition frequency $f_r$ and can be supplementally bounded by specification of a maximal distance D to be measured.

The auxiliary signal IF is, exactly such as in the case of the initially described state of the art, also here preferably a time-expanded version of the received signal E. The auxiliary signal IF is produced by means of an input circuit, in which the received signal E is fed via the directional coupler 13 to a mixer 23 and there mixed with a suitable reference signal K.

For achieving the desired time expansion, used as reference signal K is a signal composed of microwave pulses. Reference signal K is identical to the transmitted signal S as concerns frequency and pulse length of the microwave pulses, while the repetition frequency $f_r$ is made to be slightly smaller than the repetition frequency $f_r$ of the transmitted microwave pulses. Reference signal K is produced in the illustrated example of an embodiment by means of a reference signal-generator 25, which apart from the smaller repetition frequency $f_{r'}$ is identical to the transmitted signal-generator 11.

Connected after the mixer 23 is a low-pass filter 27, which passes through the lower frequencies of the time expanded received signal E and blocks the higher frequencies of the received signal E.

Available on the output of the low pass filter 27 is thus the auxiliary signal IF, which is expanded in time relative to the received signal E by a time expansion factor α, which equals a quotient of the transmission repetition frequency $f_r$ and a frequency difference Δf between the repetition frequency $f_r$ of the transmitted signal S and the repetition frequency $f_{r'}$ of the reference signal K:

$$\alpha = \frac{f_r}{\Delta f}.$$

The auxiliary signal IF is fed to the measuring and evaluation unit 5, where it is rectified on the input side by means of a rectifier 29. FIG. 2 shows an example of a rectified auxiliary signal |IF| derived with the measuring arrangement of FIG. 1 and strongly simplified for facilitating understanding. It includes two significant maxima $M_S$, $M_L$. The first maximum $M_S$ is to be attributed to crosstalk of the transmitted signal S in the transmitting and receiving system 7, wherein a signal portion of the transmitted signal S is transmitted directly via the mixer 23 to the measuring and evaluating unit 5.

The second maximum, which will be referred to as fill level maximum $M_L$, is attributable to the signal portion R of the transmitted signal S reflected on the surface of the substance 9 and received back by the transmitting and receiving system 7 after a travel time $t_L$ dependent on the separation D.

In a first method step, in each measuring cycle, a travel time t of the signal fraction reflected on the surface of the substance 9 is determined and stored as fundamental travel time $t_G$.

This can occur, for example,—such as usual in the state of the art—based on the amplitude information contained in the auxiliary signal IF. A known example of an embodiment for this is presented in the left upper half of FIG. 1. In such case, the rectified auxiliary signal |IF| is fed to a conditioning circuit composed of a log taker 31, a low-pass filter 33 and an analog-digital converter 35, whose output signal is then fed to an intelligent electronic unit 37, such as e.g. a microcontroller. The latter derives, based on the output signal of the conditioning circuit, as shown in FIG. 3, an amplitude envelope curve A(t), which is the amplitude curve of the auxiliary signal IF, and therewith also of the received signal E, as a function of travel time t. Then, a fill level maximum $M_L'$ of the amplitude envelope curve A(t) attributable to the reflection on the surface of the substance 9 is ascertained, and, based on the position of the fill level maximum the fundamental travel time to is determined. Used as fundamental travel time to can be, for example, that travel time t, at which the fill level maximum $M_L'$ has its maximum value. Since the position of the maximum value of comparatively wide maxima can only be determined to within a certain amount of measurement uncertainty, alternatively, first of all, a threshold value, travel time is can be determined, in the case of which—such as presented here—a rising or a falling edge of the fill level maximum ML' exceeds, respectively subceeds, a predetermined threshold value $A_S$ and therefrom, based on supplemental information as to the shape of the fill level maximum $M_L'$, the fundamental travel time to can then be determined.

Alternatively, the fundamental travel time $t_G$ can be ascertained in the subsequently described manner by means of the measuring and evaluation unit 5 of the invention based on frequency information contained in the auxiliary signal IF. This method is the subject matter of an additional patent application of the applicant/assignee filed at almost the same time. It is based on the idea that signal components in the received signal E retreating upon a reflection of the transmitted signal pulses of predetermined frequency $f_s$ have essentially the same frequency $f_s$ as the transmitted signal pulse. Accordingly, they form in the region of the associated fill level maximum $M_L$ of the rectified auxiliary signal |IF| signal components with a period that will be referred to as the reference period length $T_R$. The reference period length $T_R$ is equal to half of the reciprocal of the frequency corresponding to the frequency $f_s$ of the microwave pulses in the auxiliary signal IF. The auxiliary signal IF has accordingly in the travel time range of the fill level maximum ML a frequency, which equals the frequency $f_s$ of the sent microwave pulses reduced by the time expansion factor α. Correspondingly, the reference period length $T_R$ of these signal components in the rectified auxiliary signal |IF| is given by half of the reciprocal of the frequency $f_s$ of the sent microwave pulses reduced by the time expansion factor α:

$$T_R = \frac{\alpha}{2f_s}.$$

In contrast, the frequencies contained in the auxiliary signal IF in the regions lying away from the maxima are to be attributed essentially to noise. Noise signals are distinguished by a broader frequency spectrum, which results in strongly varying periods in the noise region of the auxiliary signal IF.

In order based on these considerations to be able to determine the fundamental travel time $t_G$ of the signal fraction in the auxiliary signal IF attributable to the reflection on the surface of the substance 9, first of all, based on the zero crossings of the auxiliary signal IF, the periods of the auxiliary signal IF are determined as a function of the travel time t at which they occur. For this, for example, the circuit construction described in the above mentioned EP 1324 067 A2 can be used.

The rectified auxiliary signal |IF| has minimums at the travel times t where the zero crossings of the auxiliary signal IF lie. For determining the travel times t of these minima, the rectified auxiliary signal |IF| is fed in the measuring and evaluating unit 5 to a differentiating stage 39 implemented, for example, by a bandpass filter. Differentiating stage 39 differentiates the rectified auxiliary signal |IF| twice with respect to travel time t, which results in there being present on the output of the differentiating stage 39 an output signal P(t), which gives the second derivative |IF|" of the rectified auxiliary signal |IF| with respect to travel time t, i.e.

$$|IF|'' = \frac{d^2}{(dt)^2}|IF|,$$

as a function of travel time t.

Figure 4:
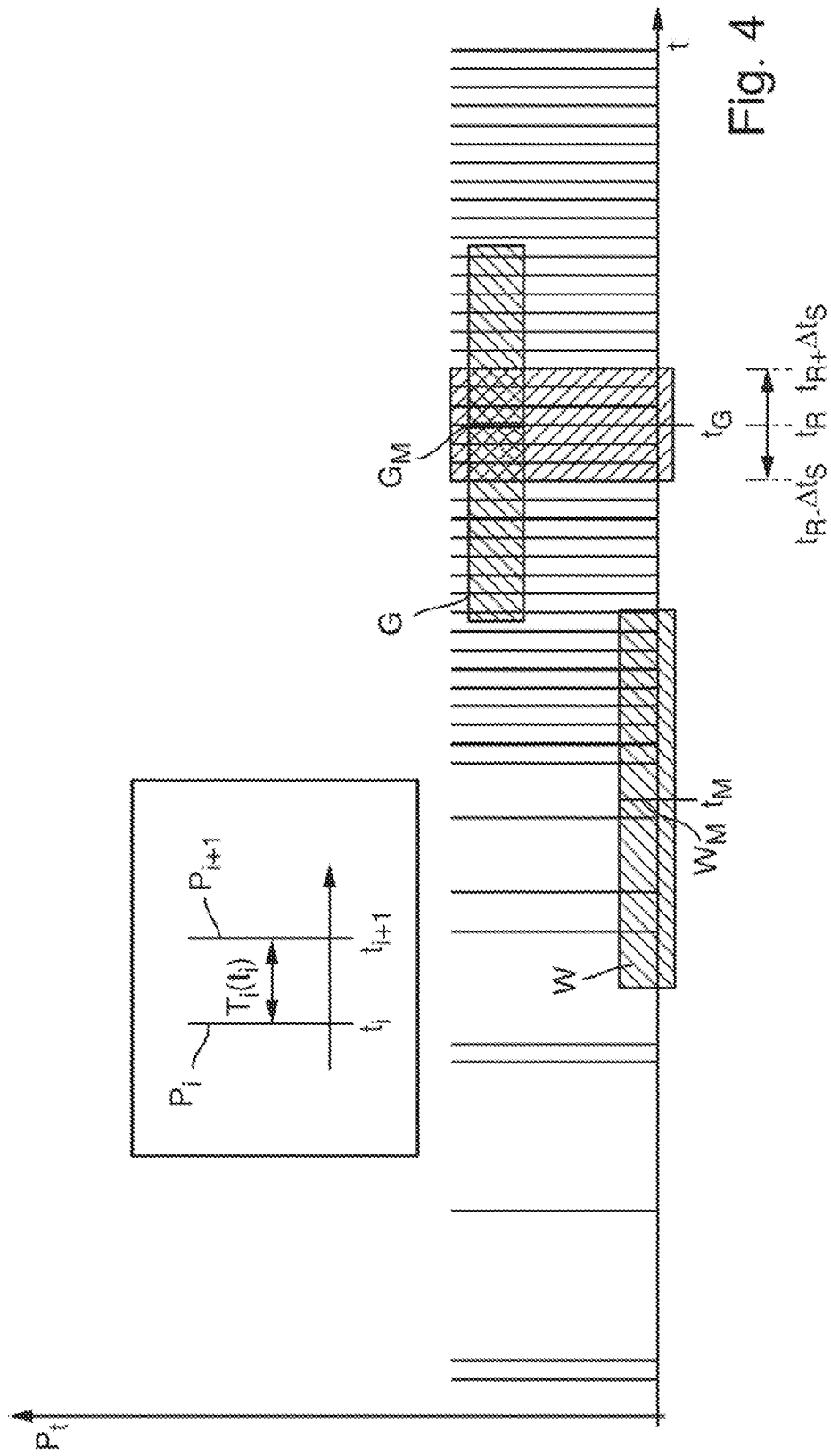
FIG. 4 is a section of a rectified auxiliary signal differentiated twice with respect to travel time.

FIG. 4 shows an example of a section of an output signal P(t) of the differentiating stage 39 for one measuring cycle in a travel time range, which covers a part of the noise region and the travel time range of the fill level maximum $M_L$ of the auxiliary signal IF.

The output signal P of the differentiating stage 39 has at all travel times $t_i$, where the auxiliary signal IF has a zero crossing, a noticeable peak $P_i$. This is shown in the elevated box in FIG. 4.

The output signal P(t) is fed to a measuring system 41, which detects the peaks $P_i$ in the output signal P and determines the associated travel times $t_i$. The measuring system 41 can in the simplest case have, for example, a comparator connected to a time measuring system. The comparator triggers the drawing of a time line extending vertically from the time axis, each time the incoming output signal P exceeds a predetermined threshold value.

The drawing of the time lines can occur with reference to an internal clock, which measures the times, at which the peaks $P_i$ occur, first of all, absolutely, i.e. without reference to the travel time t. The associating of these measured times with the travel times t can then be performed subsequently by determining the starting time $t_0$ in relation to the time measured by the clock as an offset and converting the time scale, as a whole, corresponding to the set time expansion factor α.

Alternatively, the relationship between the starting time to and the time of the internal clock can be transmitted via a control line from the transmitting and receiving system 7 to the measuring system 41. This happens, for example, via a control unit (not shown), which tells the measuring system 41 the start of the respective measuring cycle, during which the transmitted signal S composed of periodic microwave pulses was sent and, by stroboscopic sampling of the associated received signal E with the corresponding reference signal K, the present auxiliary signal IF was derived, in given cases, with the taking into consideration of a circuit-related delay time.

The measuring system 41 determined travel times $t_i$, at which the zero crossings of the auxiliary function IF occur, are fed for additional processing to an intelligent electronic unit 43, e.g. a microcontroller.

In the electronic unit 43 then the time periods $T_i$ of all time intervals lying between sequentially following zero crossings of the auxiliary signal IF are determined and stored with reference to the respective travel time $t_i$, at which it occurred. Each time interval corresponds therewith to the time separation of two neighboring peaks $P_i$, $P_{i+1}$ in the output signal P.

As shown in the elevated box in FIG. 4, the time periods $T_i$ are, in each case, equal to the difference $t_{i+1}-t_i$ of the travel times $t_{i+1}$, $t_i$, at which the corresponding two adjoining peak $P_i$, $P_{i+1}$ were detected in the output signal P. Associated with each period $T_i$ is the travel time $t_i$, at which it occurs. In the shown example, associated with the period $T_i$ is the travel time $t_i$ of the earlier detected peak $P_i$. Alternatively, associated with the time periods $T_i$ could be the travel time $t_{i+1}$ of the respectively associated later detected peak $P_{i+1}$ or also an average value the travel times $t_i$, $t_{i+1}$ of the two associated peak $P_i$, $P_{i+1}$.

As evident from FIG. 4, the time periods $T_i$ in the travel time range of the fill level maximum $M_L$ are relatively constant, while the time periods $T_i$ in the noise region vary strongly.

For determining the fundamental travel time $t_G$, the travel time range covered by the auxiliary function IF is divided, as a whole, into discrete segments of equal segment length, and a time window W defined, whose length equals a predetermined multiple of the segment length.

Alternatively, the travel time range can be divided based on the travel times $t_i$ of the zero crossings, between which the time periods $T_i$ lie, into segments of different length. In that case, the time window is defined such that it includes, in each case, a predetermined number n of sequentially following time periods $T_j$ to $T_{j+n}$. The length of the time window is, in this case, in each case, equal to the sum of the n therein contained time periods $T_j$ to $T_{j+n}$.

The time window W is in each measuring cycle beginning at the starting time to step-wise shifted over the total travel time range. In such case, it is in each step offset by one segment. Associated with each of the positions occupied, in such case, by the time windows W along the travel time axis t is a travel time t corresponding to the occupied position. The time window W covers in the position illustrated in FIG. 4 a travel time range, in which in the auxiliary signal IF a transition from the noise region into the region of the fill level maximum $M_L$ is present. Associated with each position of the time window W is preferably, in each case, that travel time $t:=t_M$, at which in the respective position a window center $W_M$ of the time window W is located.

For each position, which the time window W assumes in the case of the shifting along the travel time axis t, in each case, an appearance-frequency # is determined, with which there occur, in the travel time range covered by the time window W in the respective position, time periods $T_i$, whose length lies in the region of the reference period length $T_R$. Predetermined for this is a preferably very narrow tolerance range $+/-\Delta T$ around the reference period length $T_R$. Correspondingly taken into consideration in the case of the appearance-frequency determination are all time periods $T_i$ arising within the time window W in the respective position, which lie within the tolerance range $T_R+/-\Delta T$ around the reference period length $T_R$.

Based on the appearance frequencies # determined in this way, a period appearance-frequency distribution #(t) is derived, which gives the appearance frequencies # as a function of the respective positions of the time window W associated with travel times $t_M$.

In order to even out scatterings of the appearance-frequency values of sequentially registered period appearance-frequency distributions #(t), the period appearance-frequency distributions #(t) derived in the above described manner are preferably filtered.

For this, on the one hand, each individual period appearance-frequency distribution #(t) registered in a measuring cycle can be filtered. Suited for this is, for example, a low-pass filtering of the appearance-frequency values of the period appearance-frequency distribution #(t). The filtering of the appearance-frequency values can be performed, for example, by means of a filter with finite pulse response (FIR filter) of first order and effects, on the whole, a smoothing of the period appearance-frequency distribution #(t).

Alternatively or supplementally, for this, a filtering of mutually corresponding appearance-frequency values of period appearance-frequency distributions #(t) registered in measuring cycles following one after the other can be performed. Also suited for this is a low-pass filter, especially a FIR filter. Also, this filtering effects, on the whole, a smoothing of the filtered period appearance-frequency distributions #(t).

Moreover, supplementally, an averaging over period appearance-frequency distributions #(t), preferably filtered, period appearance-frequency distributions #(t), derived in measuring cycles following one after the other, can be performed.

Due to the above described factors determinative for the frequencies contained in the auxiliary signal IF, the time curve of the preferably filtered and/or averaged, period appearance-frequency distribution #(t) agrees qualitatively with the course of the amplitude envelope curve A(t) illustrated in FIG. 3. I.e., signal components in the received signal E attributable to a reflection of the transmitted signal S on the surface of the substance 9 located at the measured separation D of the transmitting and receiving system 7 bring about a marked fill level maximum $M_L'$ in the period appearance-frequency distribution #(t) at the travel time t required for the path to the surface of the substance 9 and back. Applied for identifying the fill level maximum $M_L'$ and for determining the associated fundamental travel time $t_G$ can be directly the above described method known for evaluating amplitude envelope curves.

According to the invention, supplementally to the fundamental travel time $t_G$ in each measuring cycle, the travel times $t_i$ of the zero crossings of the auxiliary signal IF are determined. The determining of these travel times $t_i$ occurs independently of the method selected for determining the fundamental travel time $t_G$, in the above manner already described in connection with determining the fundamental travel time $t_G$ based on the frequency information. I.e., the auxiliary signal IF is fed in each measuring cycle to the above described measuring and evaluation unit 5, which generates therefrom the rectified auxiliary signal |IF|, and therefrom produces by twice differentiating with respect to travel time t the output signal P, which has peaks $P_i$ at the travel times $t_i$ travel times t corresponding to the zero crossings. If the fundamental travel time $t_G$ was determined based on the period appearance-frequency distribution #(t), then the travel times $t_i$ of the zero crossings are already available and do not have to be determined a second time.

Fundamentally,—such as described in EP 1 324 067 A2—a phase difference between the transmitted and received signals S, E can be determined in each individual measuring cycle based on the travel times $t_i$ of the zero crossings in the region of the fill level maximum $M_L$, and this phase difference can then be used for correcting the fundamental travel time $t_G$. Here there arises, however, the initially mentioned problem of circuit and signal processing related scatter in the measured phase differences.

investigations have found that the metrologically related scattering of the phase differences of measuring cycles following one after the other in the case of unchanged separation D are essentially normally distributed.

The measurement uncertainty resulting from the metrologically related scatter in the phase differences is overcome according to the invention by registering, e.g. by plotting, based on the travel times $t_i$ of the zero crossings of auxiliary signals IF derived in measuring cycles following one after the other, a phase appearance-frequency distribution N(t) as a function of travel time t. This gives the appearance frequencies N, with which zero crossings were present at the respective travel times t in the auxiliary signals IF of the sequentially following measuring cycles considered in the plotting.

The plotting of the phase appearance-frequency distribution N(t) occurs preferably in the form of a histogram. For this, the travel time range covered by the auxiliary functions IF is divided into discrete time segments of equal duration, each of which corresponds to a histogram class. The appearance frequencies of the individual histogram classes correspond, thus, in each case, to the number of zero crossings of the considered auxiliary functions IF falling in the corresponding histogram class.

If one plots the phase appearance-frequency distribution N(t) in the case of unchanged separation D based on the travel times t of the zero crossings of the auxiliary functions IF of sequentially following measuring cycles j=1, . . . , k, then normal distributions ND sequentially following with the separation of the reference period length $T_R$ form in the phase appearance-frequency distribution N(t) in the travel time range of the fill level maximum $M_L$. In such case, the travel times $t_{ND}$, at which maxima $ND_{max}$ of the normal distributions ND occur in the region of the fill level maximum $M_L$, give the phase relationship between the corresponding transmitted and received signals S, E caused purely physically by the travel time required by the associated signal fractions for the path traveled by them.

If the separation D to be measured changes, such is first visible in the phase appearance-frequency distribution N(t), when the normal distributions ND, which then form at the travel times t corresponding to the changed separation D, overlap the normal distributions, which earlier had formed at the travel times t corresponding to the preceding separation D. In order to be able to register separation changes near in time, the number of measuring cycles following one after the other, over which the registering of the phase appearance-frequency distribution N(t) occurs, must, consequently, be limited.

The phase appearance-frequency distribution N(t) can be determined, for this, in each measuring cycle based on the travel times $t_i$ of the zero crossings of the auxiliary functions IF of the current measuring cycle and a predetermined number k of directly earlier executed measuring cycles. For this, the travel times $t_i$ of the zero crossings of the auxiliary functions IF of the individual measuring cycles are stored preferably in a ring buffer. The frequency distribution N(t) is based therewith on measurement data from a time domain corresponding to k+1 measuring cycles.

Alternatively, the phase appearance-frequency distribution N(t) can be continually plotted and updated in each measuring cycle. For this, the appearance-frequencies N of the phase appearance-frequency distribution N(t) determined in the preceding measuring cycle are multiplied in each measuring cycle with a predetermined decay factor β less one, and the travel times $t_i$ of the zero crossings newly determined in the respective measuring cycle are added to the appearance-frequencies existing at the corresponding travel times t reduced by the decay factor β. The phase appearance-frequency distribution N(t) is based therewith on measurement data from a time domain predetermined by the value of the decay factor β, wherein measurement data from preceding measuring cycles lose weight, or influence, with increasing age.

If the separation D to be measured changes with the time, then the phase appearance-frequency distribution N(t) shifts, corresponding to the changes in the separation, along the travel time axis. In such case, the measuring cycles time domain, on which the derived phase appearance-frequency distribution N(t) is based, determines how rapidly the phase appearance-frequency distribution N(t) changes to adjust to separations to be measured. I.e., the smaller the number k+1 of the considered measuring cycles, respectively the lower the decay factor β, the faster the phase appearance-frequency distribution N(t) follows the changed separation D. Conversely, fluctuations of the phase appearance-frequency distributions N(t) increase more strongly, the smaller the number k+1, respectively the lower the decay factor β.

From the number k+1 of the considered measuring cycles, respectively from the decay factor β, there results a delay, which is given by the time domain, in which the appearance-frequencies N of the maxima of the phase appearance-frequency distribution N(t) forming at the travel times t corresponding to the changed separation D increase to the extent that they overlap the maxima still existing at the travel times corresponding to the preceding separation.

The duration of a measuring cycle is given by the reciprocal of the frequency difference Δf between the repetition frequency $f_r$ of the transmitted signal S and the repetition frequency $f_{r'}$ of the reference signal K. In the case of a frequency difference Δf of 11 Hz, there results a measuring cycle duration of 0.09 s.

If one considers in the phase appearance-frequency distribution, for example, 50 measuring cycles following one after the other, then there results therefrom a delay in the evaluation in the order of magnitude of ½×50×0.09 s=2.25 s.

The number k+1 of the considered measuring cycles, respectively the decay factor β, is, consequently, to be established in relation to an expected rate of change of the fill level L in the container 1 taking into consideration the measuring cycle duration.

If the expected rate of change of the fill level L is small, then, for a high accuracy of measurement, a high number k+1 of measuring cycles, respectively a decay factor β lying near 1, can be predetermined. This is the case, for example, in applications in the oil industry, where regularly very slowly variable fill levels in extremely large tanks are measured. Since, in that field, low fill level changes bring about already large volume changes, a highly accurate measuring is especially advantageous.

Conversely, in the case of higher expected change rates of the fill level L, a correspondingly lower number k+1, respectively a correspondingly lower decay factor β, is to be applied.

Moreover, it is, above all, in applications with fluctuating fill level change rates advantageous, to match the number k+1 of considered measuring cycles, respectively the decay factor β, continuously to the fill level change rates arising in the measurement operation. In such, the fill level change rate occurring in ongoing measurement operation case can, in each case, be ascertained directly based on the fill levels L measured in any event by the fill-level measuring device in the current and in the preceding measuring cycles, and the number k+1, respectively the decay factor β, adjusted correspondingly to the current fill level change rate.

Through a corresponding selection of the number k+1 of considered measuring cycles, respectively the decay factor β, it is assured that the travel times $t_{ND}$ of the maxima $ND_{max}$ of the phase appearance-frequency distribution N(t) in the travel time range of the fill level maximum $M_L$ of the last derived auxiliary function IF at the individual travel times $t_{ND}$ give the phase positions actually physically caused by the separation D between the transmitting and receiving unit 7 and the surface of the substance 9.

Figure 5:
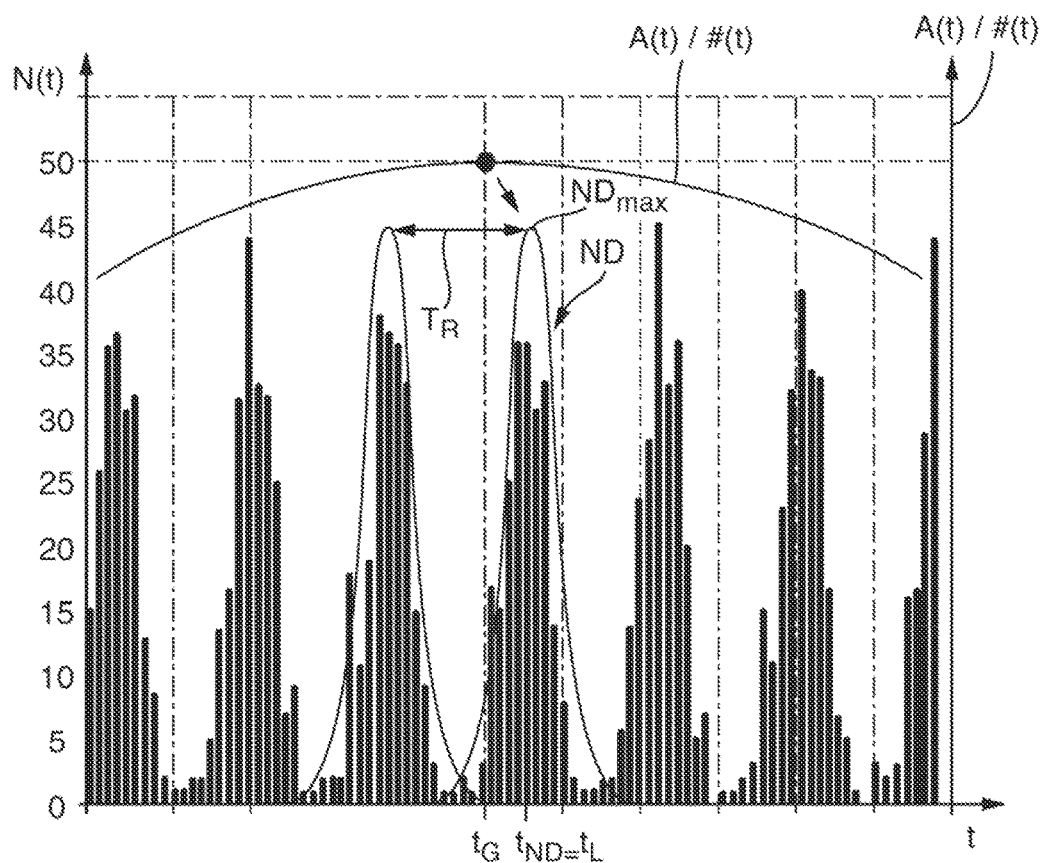
FIG. 5 is a phase appearance-frequency distribution together with an amplitude envelope curve, respectively a period appearance-frequency distribution, in the region of a fundamental travel time.

FIG. 5 shows, in this connection, an example of a phase appearance-frequency distribution N(t) together with the associated current amplitude envelope curve A(t), respectively the associated equally shaped period appearance-frequency distribution #(t) in the travel time region of the associated current fundamental travel time $t_G$.

As indicated in FIG. 5 by an arrow, in each measuring cycle the travel time $t_{ND}$ of the maximum $ND_{max}$ of the current phase appearance-frequency distribution N(t) lying nearest the fundamental travel time $t_G$ is determined as fill level travel time $t_L$ and the fill level L is determined therefrom.

In this regard, first of all, based on the propagation velocity c of the signal pulse and the fill level travel time $t_L$, the distance D to the transmitting and receiving apparatus 7 is determined according to:

$$D = 1/2 c \, t_L.$$

Based on the distance D and the installed height $H_0$ of the transmitting and receiving system 7 over the container 1, there results therefrom the fill level L to be measured according to:

$$L = H_0 - D.$$

Since the phase appearance-frequency distribution N(t) is required exclusively in the region of the fundamental travel time $t_G$, it suffices for this to register and store the zero crossings of the auxiliary signal IF in each measuring cycle exclusively in a travel time window G surrounding the fundamental travel time $t_G$ as illustrated in FIG. 4. The travel time window G preferably surrounds the fundamental travel time $t_G$ symmetrically. Moreover, it is preferably dimensioned in such a manner that it lies completely in the travel time range of the fill level maximum $M_L$ of the auxiliary signal IF, and extends on both sides of the fundamental travel time to over a plurality of reference period lengths $T_R$. For this, a travel time window width is predetermined, which is a number of reference period lengths $T_R$ smaller than the travel time range covered by the fill level-maxima $M_L$.

In the case of a transmitted signal S of microwave pulses with a frequency $f_s$ of 26 GHz and a pulse length of 800 ps sent with a repetition frequency $f_r$ of 1.8 MHz, a microwave pulse has 20 periods. Correspondingly, the fill level maximum $M_L$ of the rectified auxiliary signal |IF| has, for instance, 40 reference period lengths $T_R$. Here, for example, a travel time window G arranged symmetrically to the fundamental travel time to and having a window width of 20 reference period lengths $T_R$ can be applied. In the case of a frequency difference Δf between the repetition frequency $f_r$ of the transmitted signal S and the repetition frequency $f_{r'}$ of the reference signal K of 11 Hz, there results a time expansion factor $\alpha = f_r/\Delta f$ of $1.6 \cdot 10^{-5}$ and therewith a reference period length $T_R$ of 3 μs. A travel time window G with a window width of 20 reference period lengths $T_R$ covers therewith along the time expanded travel time axis a travel time range $[t_G - 10\, T_R; t_G + 10\, T_R]$ of 60 μs.

Fundamentally, an option is to establish the position of the travel time window G anew in each measuring cycle based on the fundamental travel time $t_G$ currently determined in such measuring cycle. Therewith, however, the position of the travel time window G would immediately be subjected to the same fluctuations as the fundamental travel time $t_G$.

Each shifting of the travel time window G along the travel time axis means, however, that the measurement data of preceding measuring cycles in the histogram required for the frequency distribution N(t) must be associated with the new position of the travel time window G. If, for example, the travel time window G is shifted to the left by two histogram class widths, then the third histogram class must be associated with the travel time, which was earlier associated with the first histogram class. If provided for each histogram class is a memory capacity for storing the number of zero crossings previously arisen in this class, then a shifting by two histogram class widths to the left means that the appearance-frequencies stored in the individual memory locations must, in each case, be copied to a memory lying two memory places further right.

In order to avoid this effort, preferably a hysteresis is provided, by which shiftings of the travel time window G are reduced to a measure necessary for distance measurement of variable distances D.

In such case, the fundamental travel time $t_G$ measured at the beginning of the method in a measuring cycle is stored as reference travel time $t_R$ for setting the position of the travel time window G along the travel time axis t. Now the travel time window G is positioned and dimensioned in such a manner that its window center $G_M$ lies at the reference travel time $t_R$, and the travel time window G extends on both sides of the reference travel time $t_R$ over a predetermined number of reference period lengths $T_R$.

For a travel time window width, in the case of which the travel time range covered by the travel time window G is, as a whole, a number of reference period lengths $T_R$ smaller than the travel time range covered by the fill level-maxima $M_L$, it is thereby assured that the travel time window G is also then still completely located in the region of the current fill level maximum $M_L$, when the separation D to be measured during the directly following measuring cycles changes by a distance ΔD, which effects a change $\Delta t_G$ of the fundamental travel time $t_G$ by a plurality of reference period lengths $T_R$.

In the following measuring cycles, in each case, the fundamental travel time to is measured anew, and a difference between the current fundamental travel time $t_G$ and the stored reference travel time $t_R$ is determined.

A matching of the position of the travel time window G to the fundamental travel time $t_G$ measured in the respective measuring cycle is only performed when the difference between the current fundamental travel time $t_G$ and the stored reference travel time $t_R$ exceeds a predetermined threshold value $\Delta t_s$. If such is the case, the stored reference travel time $t_R$ is replaced by the current fundamental travel time $t_G$, and the travel time window G positioned based on the updated reference travel time $t_R$.

Relative to the matching of the position of the travel time window G, the threshold value $\Delta t_s$ predetermines a hysteresis region of width $+/-\Delta t_s$—left-hatched in FIG. 4—around the currently present reference travel time $t_R$. I.e., the travel time window G is only adapted to the current fundamental travel time $t_G$, when such leaves the hysteresis region $[t_R-\Delta t_s; t_R+\Delta t_s]$.

In such case, the threshold value $\Delta t_s$ is to be so dimensioned as a function of travel time window width and the width of the fill level-maxima $M_L$ that the travel time window G in each measuring cycle covers a travel time range of a plurality of reference period lengths $T_R$ on both sides of the current fundamental travel time $t_G$.

Thus, in the case of the above explained example of fill level maxima $M_L$ with a width of 40 reference period lengths $T_R$ and a window width of 20 reference period lengths $T_R$, for example, a threshold value $\Delta t_s$ in the order of magnitude of three reference period lengths $T_R$ can be used. Therewith, the current reference travel time $t_R$ can migrate up to three reference period lengths $T_R$ from the window center $G_M$, before the travel time window G is shifted. Also, in the case of maximum eccentricity, there are still then at least 7 reference period lengths $T_R$ on each side of the current reference travel time $t_R$.

The curve of the plotted phase appearance-frequency distribution N(t) corresponds under ideal conditions to a sequential arrangement of identical normal distributions ND. Ideal conditions are present, when the phase appearance-frequency distribution N(t) is plotted over a large number of sequentially following measuring cycles and the separation D is constant during such measuring cycles.

Under real conditions, i.e. in the case of a limited number of measuring cycles considered in the plotting of the phase appearance-frequency distribution N(t) and changeable separation D, deviations of the phase appearance-frequency distribution N(t) from the ideally identical, sequentially following, normal distributions occur, which lead to a measurement uncertainty in the case of determining the travel times No of the maxima $ND_{max}$ of the phase appearance-frequency distribution N(t).

This measurement uncertainty can be counteracted, on the one hand, by performing a cross correlation of the derived phase appearance-frequency distribution N(t) with a reference distribution based on the ideal form of the normal distributions. The reference distribution is composed of a normal distribution or periodically with the reference period length $T_R$, sequentially following, normal distributions with an expectation value of zero and a predetermined standard deviation. Predetermined as standard deviation of the normal distributions of the reference distribution is preferably an average standard deviation of the distributions arising in the derived phase appearance-frequency distribution N(t) periodically with the reference period length $T_R$.

Alternatively, an average value filtering of the appearance-frequencies N of the phase appearance-frequency distribution N(t) can be performed. In such case, the individual appearance-frequency values are, in each case, replaced by an average value of the frequency values arising within a filter window of predetermined width around the associated travel time. Average value filtering of normally distributed data effects a reduction of the standard deviation combined with same time obtaining of the respective average value.

Another alternative is to perform an average value filtering over the travel times $t_i$ of the zero crossings of the auxiliary signals IF determined in measuring cycles following one after the other, and to plot the phase appearance-frequency distribution N(t) based on the filtered travel times obtained therefrom for the individual measuring cycles. Also this reduces the standard deviation combined with same time obtaining of the respective average values.

Then, the fill level travel time $t_L$ is ascertained as the travel time of the maximum of the distribution obtained from the cross correlation, respectively from the average value filtering, and lying nearest to the fundamental travel time $t_G$ determined in the respective measuring cycle, and therefrom the fill level L is determined.

Figure 6:
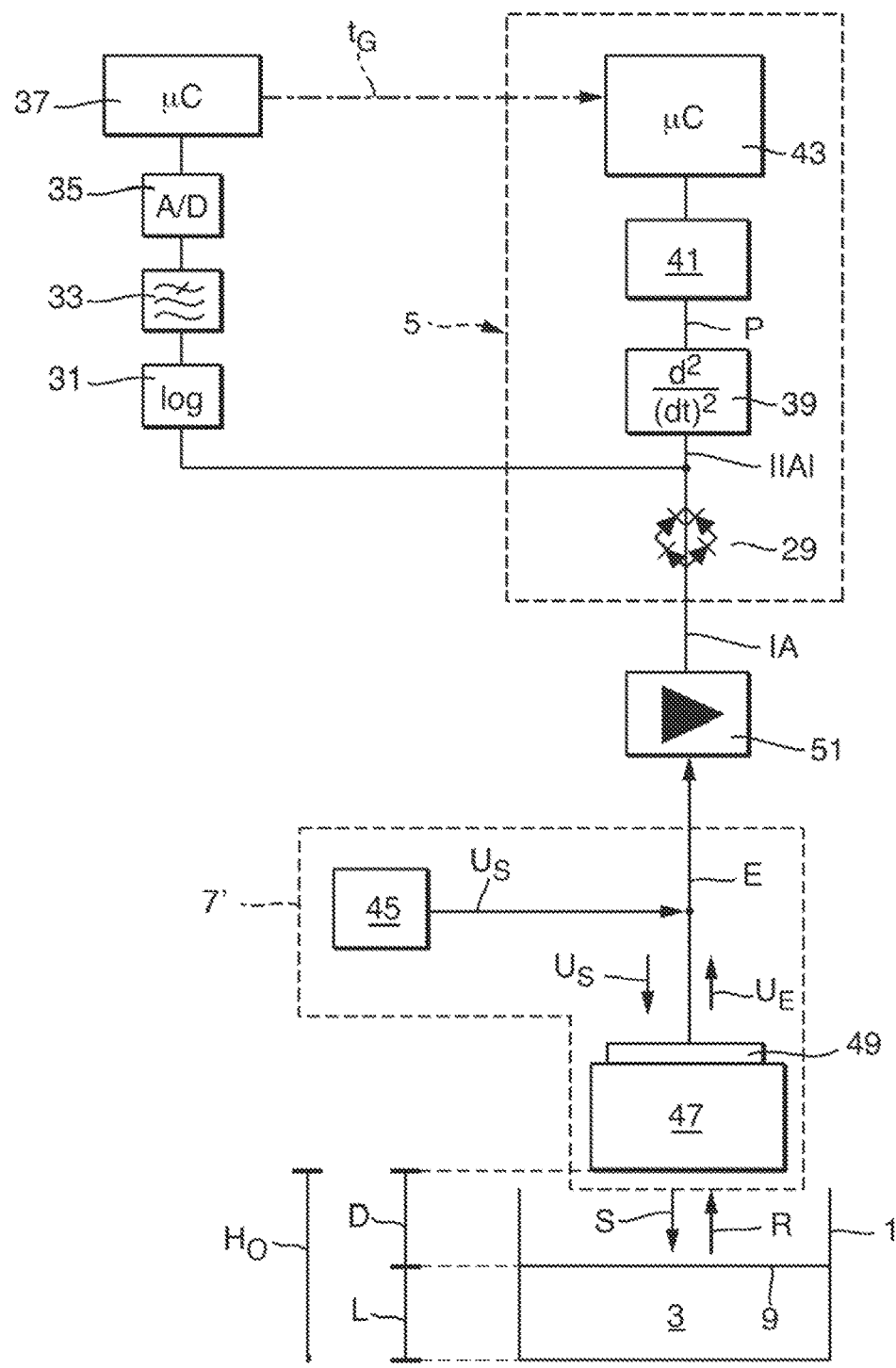
FIG. 6 is a fill level measuring arrangement having an ultrasonic fill-level measuring device.

The separation measurement method of the invention is applicable completely analogously also in with ultrasonic, fill-level measuring devices working according to the travel time principle. FIG. 6 shows a schematic representation of a fill level measuring arrangement with an ultrasonic fill-level measuring device combined with the measuring and evaluating unit 5 of the invention.

Also here, a transmitting and receiving system 7' arranged above the container 1 filled with the substance 3 is provided, by means of which from sent transmitted signals S composed of short ultrasonic pulses of predetermined frequency $f_s$ and duration are sent with a predetermined repetition rate $f_r$ toward the substance 3, and their signal components R reflected on the surface of the substance 9 received back after a travel time dependent on the traveled path t. For this, the transmitting and receiving system 7' includes a transmitted signal generator 45, which produces corresponding to the transmitted signal S an electrical alternating voltage signal $U_S$, which is fed to an ultrasonic transducer 47 installed here as transmitting and as receiving transducer. The core of the ultrasonic transducer 47 is, for example, a piezoelectric element, which converts the alternating voltage signal $U_S$ applied thereto via an electrode 49 into an ultrasonic signal and transmits such as transmitted signal S. Conversely, signal components reflected in the container 1 are received by the ultrasonic transducer 47 and converted into a corresponding alternating voltage signal $U_E$, which is then tapped on the ultrasonic transducer 47 as electrical received signal E. The other processing and evaluation of the received signal E occurs in the above described manner, wherein, however, due to the clearly lower frequencies $f_r$ of the ultrasonic pulses, a time expansion of the received signal E is not required. Correspondingly, the received signal E is fed here only to an amplifier 51, which generated therefrom an auxiliary signal IA, which corresponds to the amplified received signal E.

Also here, in each measuring cycle, in each case, an auxiliary signal IA is generated, which is then further processed in the manner already described above in connection with the fill-level measuring device working with microwaves.

In each measuring cycle, based on the auxiliary signal IA, a travel time t of the signal fraction reflected on the surface of the substance 9 is determined as fundamental travel time $t_G$. This can occur, exactly as in the case of the fill-level measuring device working with microwaves, based on an amplitude envelope curve A(t) derived from the rectified, log, filtered and analog-digital converted, auxiliary signal IA by means of the intelligent electronic unit 37 or based on the period appearance-frequency distribution #(t) derived in the above described manner with the above described measuring and evaluating circuit 5. Since, due to the lower frequencies $f_s$ of the ultrasonic pulses, no time expansion of the received signal E is required, the reference period length $T_R$ here equals half of the reciprocal of the frequency $f_s$ of the sent ultrasonic pulses.

Exactly as in the case of the earlier described example of an embodiment, also here in each measuring cycle in the above described manner the travel times $t_i$ of the zero crossings of the auxiliary signal IA are determined, and, based on the travel times $t_i$ the zero crossings of the auxiliary signals IA determined in the respectively current and in a plurality of preceding measuring cycles, a phase appearance-frequency distribution N(t) is derived, which gives appearance-frequencies, with which zero crossings were present at the respective travel times t in the corresponding auxiliary signals IA.

Also here, in each measuring cycle, the travel time $t_{ND}$ of the maximum $ND_{max}$ of the phase appearance-frequency distribution N(t) lying nearest the fundamental travel time $t_G$ is determined as fill level travel time $t_L$, and based on the propagation velocity of the signal pulse, the installed height $H_0$ of the transmitting and receiving apparatus 7' and the fill level travel time $t_L$, the fill level L is determined.

The invention claimed is:

1. A method for measuring fill level of a substance located in a container, in the case of which signal pulses of predetermined frequency are sent in measuring cycles following one after the other, comprising the steps of:

sending the signal pulses of predetermined frequency by means of a transmitting and receiving system with a predetermined repetition frequency into the container, and their signal components reflected back in the container in the direction of the transmitting and receiving system after a travel time dependent on their traveled path, are received as received signal;

based on the received signal, over a predetermined travel time range, an auxiliary signal is derived reflecting amplitude and phase information in the received signal as a function of travel time; based on the auxiliary signal, a travel time of a signal fraction reflected on a surface of the substance is determined as fundamental travel time;

travel times of zero crossings of the auxiliary signal are determined;

based on the travel times of the zero crossings of the auxiliary signals determined in the current and in a plurality of preceding measuring cycles, a phase appearance-frequency distribution is derived as a function of travel time, which gives appearance-frequencies, with which zero crossings were present at the respective travel times in the associated auxiliary signals;

a travel time of a maximum of the frequency distribution lying nearest the fundamental travel time is determined as fill level travel time;

and the fill level is determined based on a propagation velocity of the signal pulse, an installed height of the transmitting and receiving system above the container and the fill level travel time wherein:

the fundamental travel time is determined in each measuring cycle based on the travel times of the zero crossings of the auxiliary signal derived in the respective measuring cycle; time periods between sequentially following zero crossings of the auxiliary signal, are determined;

a time window of predetermined length is shifted stepwise over the total travel time range; for each position of the time window, an appearance-frequency (#) is determined, with which there occur in the time window time periods, whose length corresponds to half of a period in the auxiliary signal corresponding to the frequency of the signal pulse;

a period appearance-frequency distribution (#(t)) of the appearance-frequencies (#) is determined as a function of travel times associated with the positions of the time window, a maximum of the period appearance-frequency distribution (#(t)) attributable to the reflection of the signal pulses on the surface of the substance is determined;

and the fundamental travel time is determined based on a travel time of the fill level maximum, especially that travel time, in the case of which the fill level maximum assumes its maximum value, or that travel time, in the case of which a rising or falling edge of the fill level maximum exceeds or undershoots a predetermined threshold value; and wherein:

the travel time range for deriving the period envelope curve (#(t)) is divided into discrete segments, the length of the time window equals a length of a predetermined number of segments, the time window in the case of the stepwise shifting is shifted in each step by one segment;

and there is associated with the individual positions of the time window, in each case, that travel time, over which in the respective position a window center of the time window is located.

2. The method as claimed in claim 1, wherein:

a cross correlation of the phase appearance-frequency distribution with a reference distribution is formed;

and the fill level travel time is determined based on a travel time of a maximum lying nearest the fundamental travel time in a distribution resulting from the cross correlation.

3. The method as claimed in claim 1, wherein:

the frequency values of the phase appearance-frequency distribution are filtered by means of an average value filter; and the fill level travel time is determined based on a travel time of a maximum lying nearest the fundamental travel time in the average value filtered, phase appearance-frequency distribution.

4. The method as claimed in claim 1, wherein: an average value filtering is performed for travel times of the zero crossings of the auxiliary signals of measuring cycles following one after the other; and the phase appearance-frequency distribution is derived based on the filtered travel times obtained from this average value filtering for the individual measuring cycles.

5. The method as claimed in claim 1, wherein:

the travel time range is divided into discrete segments of equal segment length;

in each auxiliary signal, those segments are determined, in which such auxiliary signal has zero crossings; and the phase appearance-frequency distribution as is registered as a histogram, whose histogram classes each correspond to a segment.

6. The method as claimed in claim 1, wherein:

the phase appearance-frequency distribution in each measuring cycle is determined based on the travel times of the zero crossings of the auxiliary functions derived in such measuring cycle and in a predetermined number of preceding measuring cycles.

7. The method as claimed in claim 6, wherein: the number of measuring cycles considered in the phase appearance-frequency distribution is fixedly predetermined based on a predetermined fill level change rate to be expected, or the number is continuously matched to a current fill level change rate measured during the method.

8. The method as claimed in claim 1, wherein:

the registering of the phase appearance-frequency distribution occurs exclusively within a travel time window surrounding the fundamental travel time determined in the respective measuring cycle;

which window extends to both sides of the fundamental travel time (tG) over a plurality of reference period lengths, wherein the reference period length equals half of a reciprocal of a frequency corresponding to the frequency of the signal pulses in the auxiliary signal; and whose window width is smaller than a width of fill level-maxima the auxiliary functions attributable to reflections on the surface of the substance.

9. The method as claimed in claim 8, wherein:

a fundamental travel time measured at the beginning of the method is stored as reference travel time;

based on this reference travel time, a position of the travel time window along a travel time axis is established; in each measuring cycle, it is checked whether a difference between the fundamental travel time measured in such measuring cycle and the stored reference travel time exceeds a predetermined threshold value; and in each measuring cycle, in which the difference exceeds the threshold value, the stored reference travel time is replaced by an updated reference travel time, which equals the fundamental travel time measured in such measuring cycle, and the position of the travel time window is newly established based on the updated reference travel time.

10. The method as claimed in claim 9, wherein:

the threshold value is dimensioned as a function of the travel time window width and the width of the fill level-maxima of the auxiliary function in such a manner, that the travel time window in each measuring cycle covers a travel time range of a plurality of reference period lengths on both sides of the current fundamental travel time.

11. The method as claimed in claim 1, wherein:

the signal pulses are microwave pulses sent periodically with the repetition frequency; and the auxiliary signal is a time-expanded version of the received signal, or the signal pulses are ultrasonic pulses sent periodically with the repetition frequency.

12. A fill-level measuring device for performing a method according to claim 1, comprising:

a transmitting and receiving system for sending the signal pulses and for receiving the received signals, an input circuit for deriving the auxiliary signals; and a measuring and evaluation unit, which determines in each measuring cycle the travel times of the zero crossings of the auxiliary signal derived in the respective measuring cycle; and which, based on the travel times of the zero crossings of the auxiliary signals of the current and plurality of preceding measuring cycles, determines the phase appearance-frequency distribution in each measuring cycle.

13. The fill-level measuring device as claimed in claim 12, wherein:

said measuring and evaluation unit comprises: a rectifier for rectifying the auxiliary signal, a differentiating stage connected to said rectifier for determining a second derivative of the rectified auxiliary signal with respect to travel time;

a measuring system connected to said differentiating stage for registering peak and whose travel times arising in an output signal of said differentiating stage; and an intelligent electronic unit, especially a microcontroller, connected after said measuring system.

14. A method for measuring fill level of a substance located in a container, the case of which signal pulses of predetermined frequency are sent in measuring cycles following one after the other, comprising the steps of:

sending the signal pulses of predetermined frequency by means of a transmitting and receiving system with a predetermined repetition frequency into the container, and their signal components reflected back in the container in the direction of the transmitting and receiving system after a travel time dependent on their travel path, are received as received signal;

based on the received signal, over a predetermined travel time range, an auxiliary signal is derived reflecting amplitude and phase information in the received signal as a function of travel time;

based on the auxiliary signal, a travel time of a signal fraction reflected on a surface of the substance is determined as fundamental travel time;

travel times of zero crossings of the auxiliary signal are determined;

based on the travel times of the zero crossings of the auxiliary signals determined in the current and in a plurality of preceding measuring cycles, a phase appearance-frequency distribution is derived as a function of travel time, which gives appearance-frequencies, with which zero crossings were present at the respective travel times in the associated auxiliary signals;

a travel time of a maximum of the frequency distribution lying nearest the fundamental travel time is determined as fill level travel time;

fill level is determined based on a propagation velocity of the signal pulse, an installed height of the transmitting and receiving system above the container and the fill level travel time;

the phase appearance-frequency distribution is registered continuously and updated in each measuring cycle, by multiplying in each measuring cycle the appearance-frequencies of the phase appearance-frequency distribution determined in the preceding measuring cycle with a predetermined decay factor; and adding the travel times the zero crossings newly entering in the respective measuring cycle to the appearance-frequencies existing at the corresponding travel times, as reduced by the decay factor.

* * * * *